Figure 1:
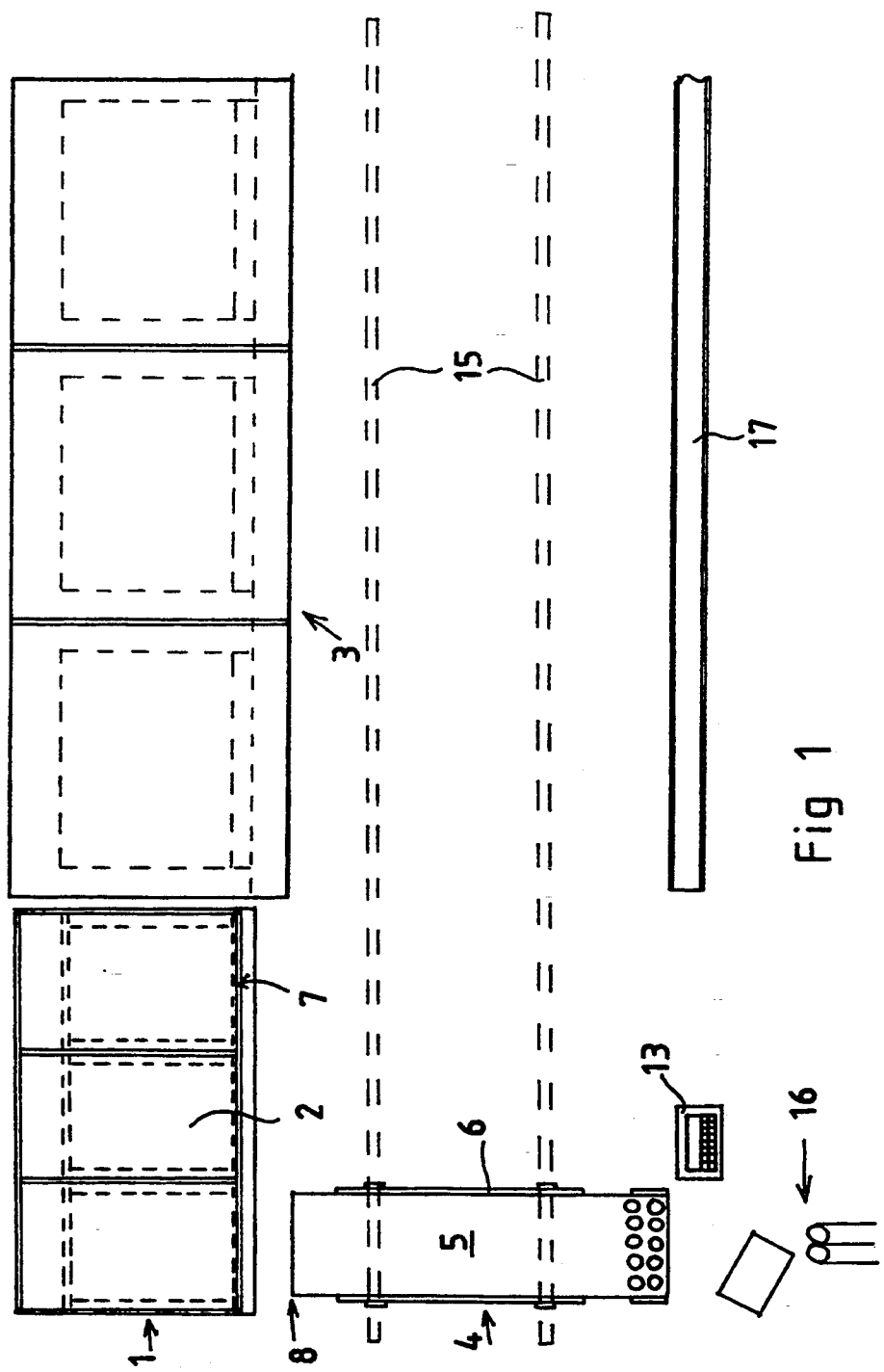

United States Patent
Savolainen et al.

[11] Patent Number: 5,396,835
[45] Date of Patent: Mar. 14, 1995

[54] APPARATUS FOR RAISING AND BAKING BAKERY GOODS

[76] Inventors: Matti Savolainen, Oksapolku 9, FIN-48400 Kotka; Pentti Kleimola, Vellamontie 1, FIB-45700 Kuusankoski, both of Finland

[21] Appl. No.: 160,382

[22] Filed: Dec. 1, 1993

[30] Foreign Application Priority Data

Aug. 27, 1993 [FI] Finland ................... 935055

[51] Int. Cl.6 ................... A21B 3/18
[52] U.S. Cl. ................... 99/443 C; 99/357; 99/477
[58] Field of Search ............ 99/443 C, 386, 423, 99/357, 477, 479; 126/281

[56] References Cited
U.S. PATENT DOCUMENTS

| | | | |
|---|---|---|---|
| 4,882,981 | 11/1989 | Bacigalupe et al. | 99/479 |
| 5,123,336 | 6/1992 | König | 99/443 C |

FOREIGN PATENT DOCUMENTS

| | | | |
|---|---|---|---|
| 2492224 | 4/1982 | France | 99/443 C |
| 2934369 | 3/1980 | Germany . | |

*Primary Examiner*—David A. Scherbel
*Assistant Examiner*—Reginald L. Alexander
*Attorney, Agent, or Firm*—Merchant & Gould, Smith, Edell, Welter & Schmidt

[57] ABSTRACT

Apparatus for raising and baking bakery goods, comprising a raising rack (1) with fixed raising planes (2), a grate oven (3) and a transport means (4) for transporting the bakery goods to said raising rack, thence to a grate oven and out from said grate oven, said transport means featuring a transport plane (6) provided with a round-going belt (5) and which can be lifted and lowered and horizontally moved into desired position. The raising rack (1) comprises closable and openable hatches (7) individual to each raising plane. Moreover, the point (8) of the transport plane (6) of the transport means (4) is provided with a round-shaped sliding surface (9), the belt running around said point when bakery goods are being taken up on the transport plane and when they are given off therefrom.

10 Claims, 4 Drawing Sheets

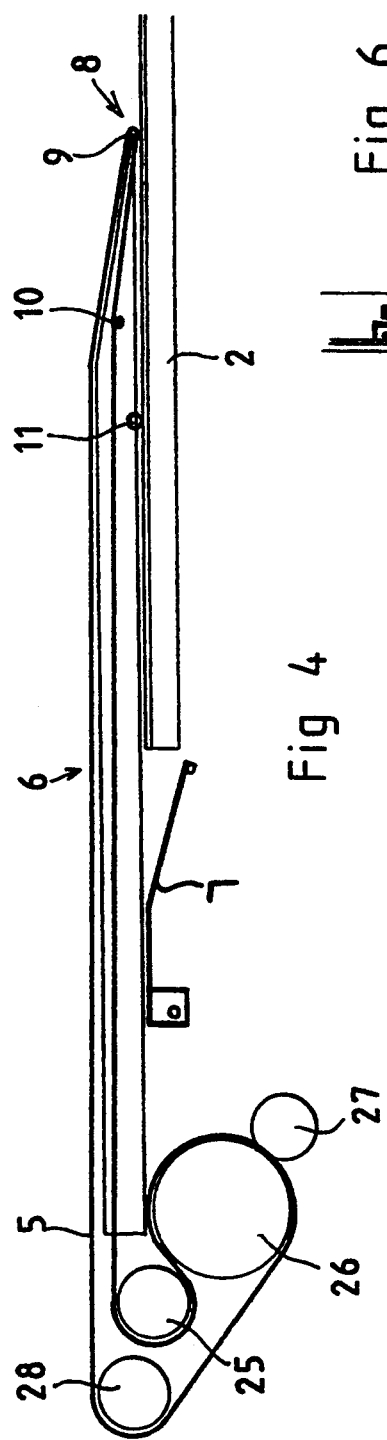
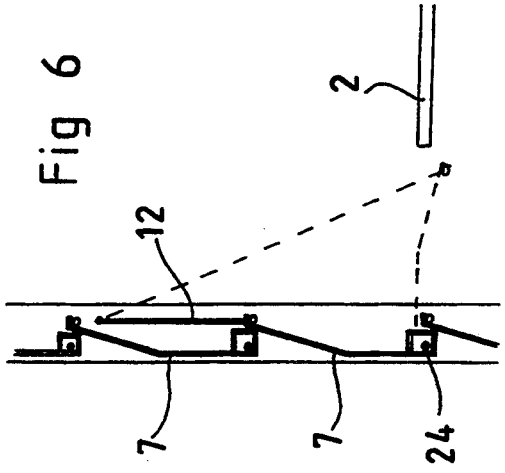
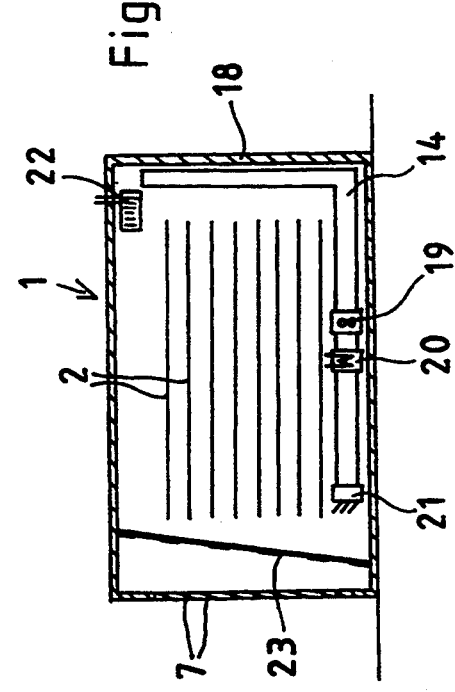

APPARATUS FOR RAISING AND BAKING BAKERY GOODS

The present invention concerns apparatus for raising and baking bakery goods.

Making, raising and baking bakery goods is largely manual work at present. Bakeries employ either a raising cabinet, into which the bakery goods to be raised are pushed on a roller rack, said goods having been placed on the shelves thereof after being made, or a raising run, where the goods travel on chained tracks during the raising process.

The greatest drawback in present practice is that the raising time has to be the same for all bakery goods processed in a continuous batch. It is not possible, while raising is going on, to remove any portion of the goods for immediate baking: the bakery goods placed on the run must all be baked in the same succession in which they were deposited. Conditions are similar in existing raising cabinets. It is not sensibly nor economically possible to remove therefrom, for baking, any separate batches which have been raised: all transfers must be a whole roller rack at a time.

Furthermore, a great deal of human labour is required in operations according to present practice, because the roller racks are largely filled and emptied by hand, they are pushed into the raising cabinets by human effort and in similar manner, after the raising phase, transferred into the oven for baking and, further, out of the oven in due time.

An attempt has been made to eliminate these problems by means of apparatus disclosed in the U.S. Pat. Des. No. 2,934,369. However, the apparatus presented in said reference does not operate satisfactorily, it requires rather much human labour, and it will not operate in processing small, and light, bakery goods, above all.

The object of the invention is to eliminate the drawbacks mentioned. The specific object of the invention is to provide novel apparatus for raising and baking bakery goods by the aid of which the raising and baking operations can be maximally automated and made flexible to enable different raising and baking times, as well as different raising and baking conditions, to be applied substantially simultaneously.

Regarding the features characterizing the invention, reference is made to the Claims section.

The apparatus of the invention for raising and baking bakery goods comprises a raising rack with fixed raising planes, a grate oven, and a transport means for transporting the bakery goods onto the raising rack, therefrom into the grate oven, and out from the grate oven. Said transport means features a transport plane provided with a roundgoing, endless belt and which can be lifted and lowered, and moved horizontally into various positions, as implied by the different phases of operation. As taught by the invention, the raising rack comprises separate, closable and openable hatches individual to each raising plane, and furthermore, the point of said transport means is provided with a round-shaped sliding surface, said endless belt running around the point of the transport plane as bakery goods are being taken up on the transport plane and delivered therefrom.

Advantageously, the transport plane of the invention comprises a transversal brace supporting the belt, in the vicinity of the point and under the transport plane, so that this brace will lift upward the belt which has curved about the point to the underside, so as to make the belt touch e.g. the hot grate only at the very tip of the point while the transport plane has been pushed into the grate oven for inserting bakery goods therein or for removing them. Hereby, the hot grate will not burn the belt, as contact with the grate only occurs over a minor area and for a brief moment. This contact is indispensable, however, in order to enable also small and light bakery goods to be lifted mechanically onto the belt without damaging them.

Advantageously, the endless belt employed in connection with the transport plane is arranged to revolve in both directions with a speed consistent with the movement of the transport plane, so that the topside of the belt, on which the bakery goods being processed reside, might be stationary relative to that plane on which bakery goods are being deposited or from which they are being removed. Hereby the piece of bakery goods which is being moved past the point of the transport plane is not subjected to any compressing or distending forces: the belt merely lifts it up, upon the transport plane, or lowers it from the belt onto the grate or onto the raising plane.

Advantageously, the transport plane comprises a suitable supporting member: a roller, wheels or another equivalent bearing arrangement, which braces the transport plane against the raising plane or against the grate and, at the same time, guides the point of the transport plane accurately and exactly into the vicinity of the respective surface.

Advantageously, the openable hatches of the raising rack are so articulated, or hinged, and inward opening that they are opened by means of the movement of the transport plane, i.e., by pushing the transport plane against the hatch, which will thus turn and enable the transport plane to access freely the respective raising plane level. The design may be implemented by means of a separate pusher member belonging to the transport plane, which hits against the hatch, or the point of the transport plane may directly push the hatch open, out of the way.

Advantageously, a return member is provided in conjunction with the hatch on the raising rack, that is, a spring or equivalent mechanical structure, which closes the hatch immediately on withdrawal of the transport plane. It is also conceivable that the return member is implemented by providing an appropriate counterweight or by otherwise pivoting the hatch in such manner that the hatch will be returned to its closed position by gravity.

The apparatus of the invention affords several remarkable advantages over prior art. The apparatus is fully automatable, whereby it is possible in one baking shop to bake simultaneously products requiring different raising times, and the apparatus takes care of transporting the bakery goods onto the raising plane of the raising rack which is desired, and therefrom after desired raising time into the grate oven to be baked on desired level, for desired length of time. Furthermore, the apparatus of the invention enables highly exact and accurate bakery goods handling in that also small bakery goods will be transported without damage from one phase to the other in this apparatus. A further advantage is the possibility of modifying the apparatus; in other words, the capacity, or volumetric space, of the raising rack and of the grate oven may be even greatly variable, depending on the products meant to be turned out with the apparatus and on the processing times which they need. Moreover, different processing conditions can be applied in different raising chambers and in different ovens, freely and independent of each other.

Figure 2:
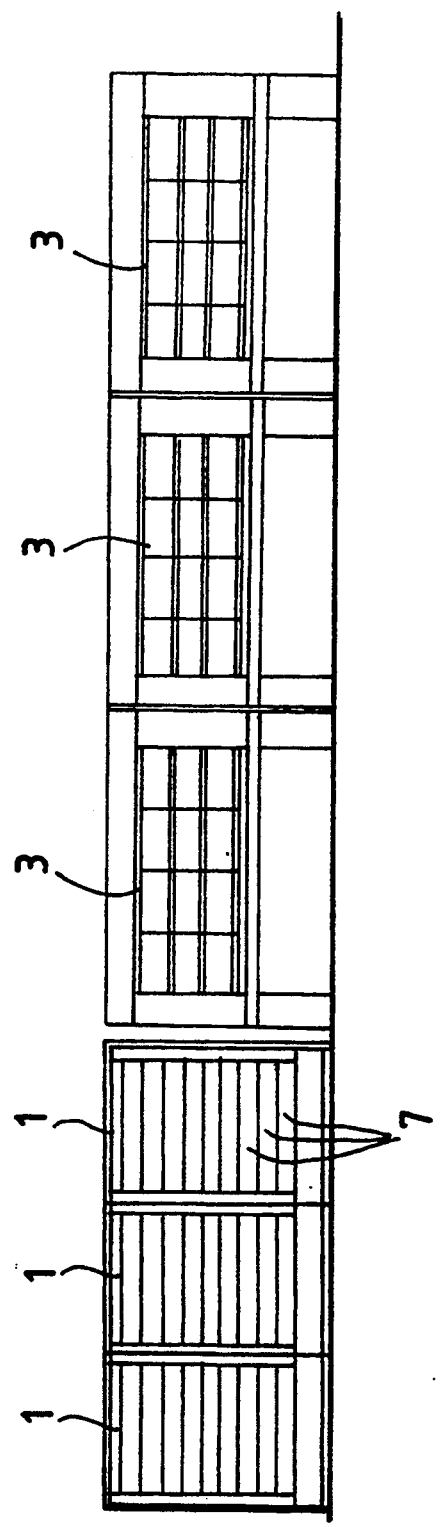
Figure 3:
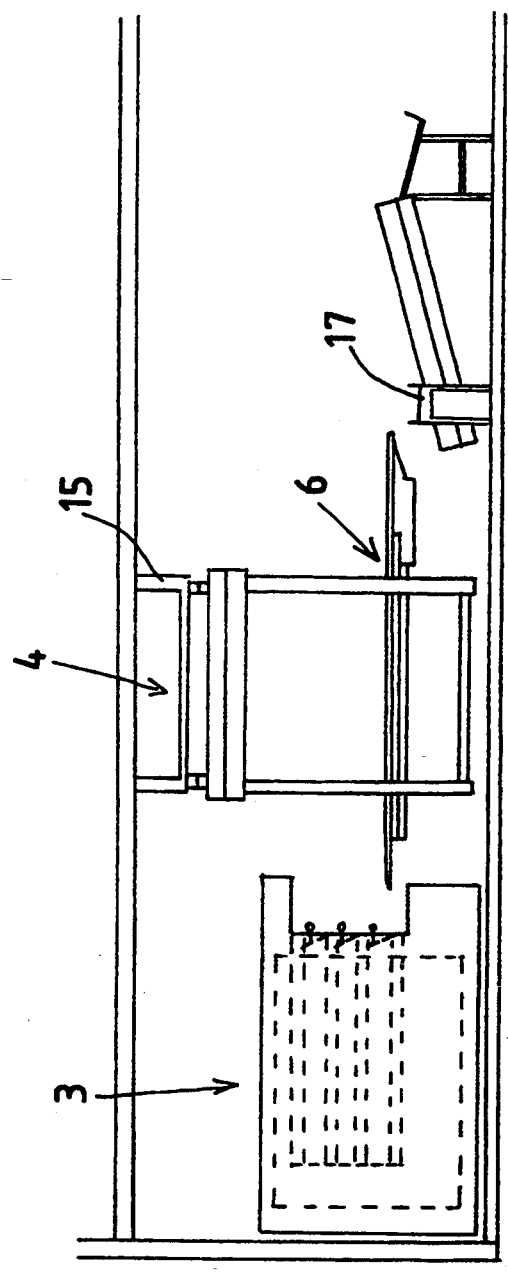

In the following the invention is described in detail, referring to the drawings attached, wherein:

FIG. 1 presents, schematically and in top view, an apparatus according to the invention, FIG. 2 presents part of the apparatus of FIG. 1, in elevational view, FIG. 3 presents part of the apparatus of FIG. 1, seen from one end, FIG. 4 represents a schematic elevational view of a transport plane according to the invention, FIG. 5 represents a schematic inside view of the raising rack, and FIG. 6 shows a detailed elevational view of the hatch design of the raising rack.

In FIGS. 1 to 3 is schematically depicted an apparatus according to the invention, comprising three side-by-side raising racks 1 having fixed raising planes 2, and beside the raising racks, three grate ovens 3. Before the raising racks and ovens is provided a transport means 4 movable on a rail arrangement 15, a make-up station 16, and a conveyor 17 for transporting finished products e.g. to a packaging area.

The raising rack comprises, as shown in FIG. 5, a plurality of fixed raising planes 2, one above the other, which are suitably spaced both from the hatches 7 and from the rear wall 18 of the raising rack, so that free space is left for air flows both in front of and behind the raising planes.

The raising rack 1 further comprises an air conditioning system 14, with a blower 19, heater 20 and humidity control means 21. In the raising rack is further provided a cooler 22 and a heat curtain 23 to be placed between the raising planes 2 when refrigeration is employed; in raising operation this curtain may be removed as unnecessary.

FIG. 6 shows in greater detail the design of the hatch 7 of the raising rack. For each raising plane 2 there is a specific hatch 7, the pivot point 24 of the hatch being substantially level with the raising plane 2. The hatch consists of a planar plate extending substantially upward from the pivot point 24 and resting against the lower edge of the next hatch when in its position at rest. The hatch is held in its upper position, supported by a spring-like return member 12. The hatch opens inward toward the raising rack and can be opened by pushing against the hatch, whereby the return member 12 is distended and the hatch turns to become substantially parallel with the respective raising plane 2, thus giving free access to the entire space above the raising plane and below the next raising plane.

As shown in FIG. 3, the transport means 4 may be carried by rails 15 mounted to the ceiling, or it may equally run on rails provided on the floor. As shown in FIG. 4, the transport means comprises a substantially horizontal transport plane 6, consisting of an endless, circulating belt 5. The belt runs over a round-shaped sliding surface 9 on the point 8 of the transport plane, supported on the underside by a transversal brace 10, which lifts the belt upward. The belt runs from here to the other end of the transport plane, to a first deflection roll 25, thence to a traction roll 26, through between the traction roll and a press roll 27 to a second deflection roll 28, from which the belt goes back to constitute the horizontal transport plane. The transport means further comprises a supporting member 11 on the underside of the transport plane, e.g. a suitable slide or roller bearing, the transport plane resting by means of this bearing e.g. on the raising plane 2.

The apparatus according to the invention, depicted in the drawings, is operated as follows. The bakery goods are prepared at the make-up station 16, mechanically or by hand, and they are placed on the transport plane 6 of the transport means 4, upon the belt 5. Adequate control data concerning the bakery goods in hand are entered in a programming and control unit 13, or an appropriate code is entered by which the apparatus identifies the bakery goods and the handling which they require. Next, the transport means moves the transport plane to the raising rack into register with a suitable raising plane 2, and pushes the transport plane up against the hatch 7, whereby the hatch opens and the transport plane 6 moves along the raising plane as shown in FIG. 4. When the transport plane is withdrawn from the raising plane, the belt 5 is rotated accordingly, whereby the bakery goods remain where they are on the raising plane.

When the bakery goods have been sufficiently raised, the transport plane goes in similar manner to take the raised goods off the raising plane and conveys them to a grate oven 3 with appropriate temperature, where they are baked a predetermined time. The finished bakery goods are conveyed by the transport means to a belt conveyor, which takes them e.g. to a packaging area.

With the transport apparatus of the invention, the transport means 4 can continuously transport various kinds of bakery goods and groups of such to raising racks with different conditions, and likewise to grate ovens with different temperatures, whereby every batch of bakery goods will in the different phases get the treatment times which are the best possible ones for them, quite independent of the handling of other bakery goods.

It is also conceivable that the raising rack 1 is used for refrigeration, in which case a given batch of bakery goods may be made up and deposited in the raising rack e.g. on the preceding day and kept under refrigeration overnight, and it will then be ready for raising and baking early on the next morning. It is then advantageous to use a heat curtain in the oven, behind the hatches 7, so that a low and uniform enough temperature is maintained in the raising rack.

In the foregoing the invention has been described in exemplary way with the aid of the drawings attached, while various embodiments of the invention are feasible within the scope of the inventive idea confined by the claims.

What is claimed is:

1. An apparatus for raising and baking bakery goods comprising:
   a) a raising rack including a plurality of fixed raising planes, the raising rack including hatches movable between open and closed positions, the hatches corresponding to each of the fixed raising planes;
   b) an oven including at least one grate;
   c) means in communication with the raising rack and the oven for transporting the bakery goods between the raising rack and the oven, the transporting means including a circulating belt, the circulating belt extending around a round-shaped sliding surface whereby the circulating belt moves around the round shaped sliding surface when the bakery goods are being moved onto and off of the transporting means; and d) means for lifting, lowering and horizontally moving the transporting means.

2. The apparatus of claim 1, wherein the transporting means further comprises a transversal brace supporting the circulating belt, for lifting the circulating belt upward, whereby the circulating belt contacts the raising planes and the grates on which the bakery goods are deposited or removed.

3. The apparatus of claim 1, wherein the circulating belt moves at a speed consistent with the movement of the transporting means.

4. The apparatus of claim 3, wherein the transporting means further comprises a supporting roller, for bracing the transporting means against a raising plane of the raising rack and against a grate of the grate oven when the transporting means contacts the raising plane and the grate.

5. The apparatus of claim 4, wherein the hatches are hinged to the raising rack and open inward, toward the raising rack when pushed by the transporting means.

6. The apparatus of claim 5, wherein the hatch of the raising rack includes a return member for closing the hatch upon retraction of the transporting means.

7. The apparatus of claim 6, wherein the raising planes of the raising rack are located at a distance from their respective hatches substantially equivalent to the height of the hatches, whereby there is a space for accommodating each hatch when each hatch is opened.

8. The apparatus of claim 7, wherein the raising rack includes a rear wall and spaces between the rear wall of the raising rack and the raising planes, for air circulation around the raising planes.

9. The apparatus of claim 8, further comprising a programming and control unit for controlling the transporting means for transporting the bakery goods for a suitable length of time into the raising rack and into the oven.

10. The apparatus of claim 9, wherein the raising rack additionally comprises an air conditioning system for providing appropriate air circulation, temperature and humidity for the bakery goods which are being raised.

* * * * *